United States Patent
Hattori

(10) Patent No.: US 9,680,359 B2
(45) Date of Patent: Jun. 13, 2017

(54) DRIVE DEVICE FOR ELECTRIC VEHICLE WITH RESPECTIVE MOTOR GENERATORS HAVING A COPRIME NUMBER OF FASTENERS RELATIVE TO EACH OTHER

(75) Inventor: Hiroyuki Hattori, Okazaki (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 297 days.

(21) Appl. No.: 14/237,175

(22) PCT Filed: Jul. 31, 2012

(86) PCT No.: PCT/IB2012/001479
§ 371 (c)(1),
(2), (4) Date: Feb. 5, 2014

(87) PCT Pub. No.: WO2013/021250
PCT Pub. Date: Feb. 14, 2013

(65) Prior Publication Data
US 2014/0175927 A1    Jun. 26, 2014

(30) Foreign Application Priority Data
Aug. 9, 2011 (JP) .................. 2011-173658

(51) Int. Cl.
*H02K 16/00* (2006.01)
*H02K 5/24* (2006.01)

(52) U.S. Cl.
CPC ............ *H02K 16/00* (2013.01); *H02K 5/24* (2013.01); *B60L 2220/50* (2013.01); *B60L 2270/145* (2013.01); *Y02T 10/641* (2013.01)

(58) Field of Classification Search
CPC ...... H02K 5/24; H02K 16/00; B60L 2220/50; Y02T 10/641

USPC .................... 310/89, 112, 113, 114
See application file for complete search history.

(56) References Cited

U.S. PATENT DOCUMENTS

| 5,528,094 A | 6/1996 | Hasebe et al. |
| 2005/0204537 A1* | 9/2005 | Reed ............ B60K 6/26 29/469 |
| 2006/0255671 A1* | 11/2006 | Tang ............ F04D 25/08 310/89 |
| 2008/0106163 A1* | 5/2008 | Mizuno ............ B60K 6/365 310/83 |

(Continued)

FOREIGN PATENT DOCUMENTS

| JP | 6-284665 | 10/1994 |
| JP | 2005-304213 | 10/2005 |

(Continued)

OTHER PUBLICATIONS

Hattori et al., English Translation of JP 2009149114 A, Jul. 9, 2009.*

*Primary Examiner* — Joshua Benitez-Rosario
*Assistant Examiner* — Rashad Johnson
(74) *Attorney, Agent, or Firm* — Finnegan, Henderson, Farabow, Garrett & Dunner, LLP

(57) ABSTRACT

An electric vehicle drive device includes a casing; and a plurality of motor generators mounted in the casing, each of the motor generators including a plurality of fastening portions at which a stator of the motor generator is fixed to the casing, and a number of the fastening portions of one of the motor generators being coprime to a number of the fastening portions of at least one of the rest of the motor generators.

4 Claims, 3 Drawing Sheets

(56) References Cited

U.S. PATENT DOCUMENTS

| | | | | |
|---|---|---|---|---|
| 2010/0289365 A1* | 11/2010 | Bando | ............. | H02K 16/02 |
| | | | | 310/156.01 |
| 2011/0025155 A1* | 2/2011 | Kurosawa | ............. | H02K 5/24 |
| | | | | 310/91 |
| 2014/0111048 A1* | 4/2014 | Garcia | ............. | B60K 6/26 |
| | | | | 310/113 |
| 2014/0265694 A1* | 9/2014 | Matsuoka | ............. | H02K 5/225 |
| | | | | 310/112 |
| 2014/0290429 A1* | 10/2014 | Hasegawa | ............. | F16H 57/027 |
| | | | | 74/606 A |
| 2015/0236573 A1* | 8/2015 | Takei | ............. | H02K 16/00 |
| | | | | 310/112 |

FOREIGN PATENT DOCUMENTS

| | | | |
|---|---|---|---|
| JP | 2009149114 A | * | 7/2009 |
| JP | 2010-114978 | | 5/2010 |

* cited by examiner

DRIVE DEVICE FOR ELECTRIC VEHICLE WITH RESPECTIVE MOTOR GENERATORS HAVING A COPRIME NUMBER OF FASTENERS RELATIVE TO EACH OTHER

CROSS-REFERENCE TO RELATED APPLICATIONS

This application is a national phase application of International Application No. PCT/IB2012/001479, filed Jul. 31, 2012, and claims the priority of Japanese Application No. 2011-173658, filed Aug. 9, 2011, the content of both of which is incorporated herein by reference.

BACKGROUND OF THE INVENTION

1. Field of the Invention

The present invention relates to a drive device for an electric vehicle.

2. Description of Related Art

In recent years, electric vehicles that are driven by a motor or a motor generator have been widely used. When a rotor of the motor or the motor generator rotates, vibration and noise at a particular frequency is caused in the entire stator in response to a magnetic reaction force, with fixed points of the stator serving as nodes and intermediate portions between the fixed points serving as anti-nodes. That is, the stator may be deformed to cause noise and vibration when the electric vehicle is driven. In order to suppress such vibration and noise, Japanese Patent Application Publication No. 2005-304213 (JP-2005-304213-A) discloses pressing the entire outer peripheral surface of a stator core using an end plate, pressing intermediate portions between fixed portions of the stator core using a pressing plate, and disposing the fixed portions of the stator core at unequal intervals in the circumferential direction. JP-2005-304213-A thus proposes suppressing vibration of the stator core at a particular frequency.

In a drive device for an electric vehicle that incorporates a motor, rotation of a rotor causes cogging torque, which causes vibration and noise. Thus, it is proposed, in a drive device for an electric vehicle in which two motors are mounted in one casing, to suppress vibration and noise during rotation of the rotor by shifting the respective assembly positions of the two rotors in the rotational direction by a set angle to shift field excitation timings (see Japanese Patent Application Publication No. 06-284665 (JP-06-284665-A), for example).

Vibration and noise may be caused by resonance between vibration due to regenerative torque produced when regenerative braking is applied in an electric vehicle and structural vibration of the vehicle. In order to reduce noise during application of regenerative braking, it is proposed to make a comparison between the vibration frequency of a motor and the vibration frequency of a drive range to reduce regenerative torque in a drive range in which the vibration frequency of the motor and the structural vibration frequency of the vehicle resonate with each other. On the other hand, it is also proposed to increase regenerative torque in a drive range in which the vibration frequency of the motor and the structural vibration frequency of the vehicle do not resonate with each other. It is proposed to reduce vibration and noise caused by regenerative torque by reducing and increasing regenerative torque (see Japanese Patent Application Publication No. 2010-114978 (JP-2010-114978-A), for example).

In an electric vehicle drive device that includes a plurality of, for example two, motor generators, stator core plates with the same size are occasionally used for the stators. In this case, the two stators have the same specific frequency. Therefore, the two stators may resonate with each other to cause significant vibration and noise.

SUMMARY OF THE INVENTION

The present invention provides an electric vehicle drive device that includes a plurality of motor generators.

An aspect of the present invention relates to a drive device for an electric vehicle. The drive device includes a casing and a plurality of motor generators mounted in the casing, each of the motor generators including a plurality of fastening portions at which a stator of the motor generator is fixed to the casing, and a number of the fastening portions for one of the motor generators being coprime to a number of the fastening portions for at least one of the rest of the motor generators.

In the aspect of the present invention, a position of at least one of the fastening portions for the one of the motor generators may be offset, in a circumferential direction of the stators, from positions of all of the fastening portions for the at least one of the rest of the motor generators. The fastening portions may be disposed at unequal intervals in the circumferential direction of the stators in at least one of the stators. Each of the stators may include stator core plates with the same shape.

According to the aspect of the present invention, vibration and noise caused by the electric vehicle drive device that include the plurality of motor generators is reduced.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
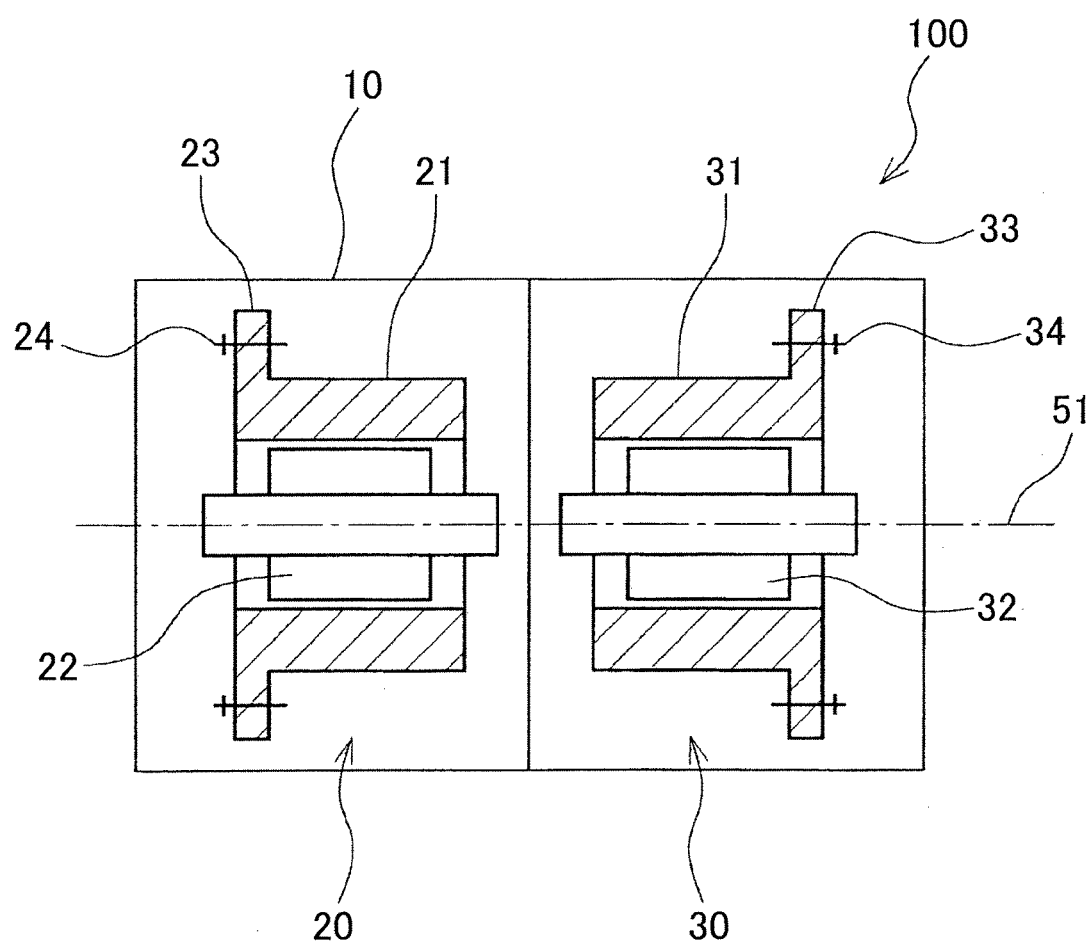
FIG. 1 is a schematic cross-sectional view showing a drive device for an electric vehicle according to an embodiment of the present invention.

A first embodiment of the present invention will be described below with reference to the drawings. As shown in FIG. 1, a drive device 100 for an electric vehicle according to the first embodiment includes a casing 10 and motor generators 20 and 30. The motor generators 20 and 30 are mounted in the casing 10 coaxially with a center line 51. That is, the motor generators 20 and 30 are mounted in the common casing 10. The first motor generator 20 includes a first stator 21 and a first rotor 22. The second motor generator 30 includes a second stator 31 and a second rotor 32. In the first embodiment, the center axis 51 of the first stator 21 and the center axis 51 of the second stator 31 coincide with each other. Each of the first and second stators 21 and 31 includes a stator core that is formed by stacking thin electromagnetic steel sheets, a plurality of slots that are formed in the stator core, and coils that are inserted into the respective slots. A plurality of lugs 23 and 33 are respectively provided at one end of the first and second stators 21 and 31 in the axial direction to project outward in the radial direction. The stators 21 and 31 are fastened and fixed to the casing 10 by inserting fixation bolts 24 and 34 through holes that are provided in the lugs 23 and 33, respectively. The lugs 23 and 33 serve as fastening portions that are used to fasten and fix the stators 21 and 31, respectively, to the casing 10. In FIG. 1, power transfer mechanisms, such as planetary gears, that are connected to the rotors 22 and 32 to transfer power to drive wheels of the vehicle are not shown.

The first and second stators 21 and 31 are formed by stacking identical stator core plates (electromagnetic steel sheets). The first and second stators 21 and 31 have the same outside diameter and the same inside diameter. The number and the shape of the slots of the stator core of the first stator 21 are also the same as the number and the shape of the slots of the stator core of the second stator 31. In FIG. 1, the lugs 23 and 33 of the stators 21 and 31 for fastening are provided on respective end surfaces of the stators 21 and 31 that are opposite to each other in the axial direction. However, the lugs 23 and 33 may be provided on respective end surfaces of the stators 21 and 31 that are on the same side.

Figure 2A:
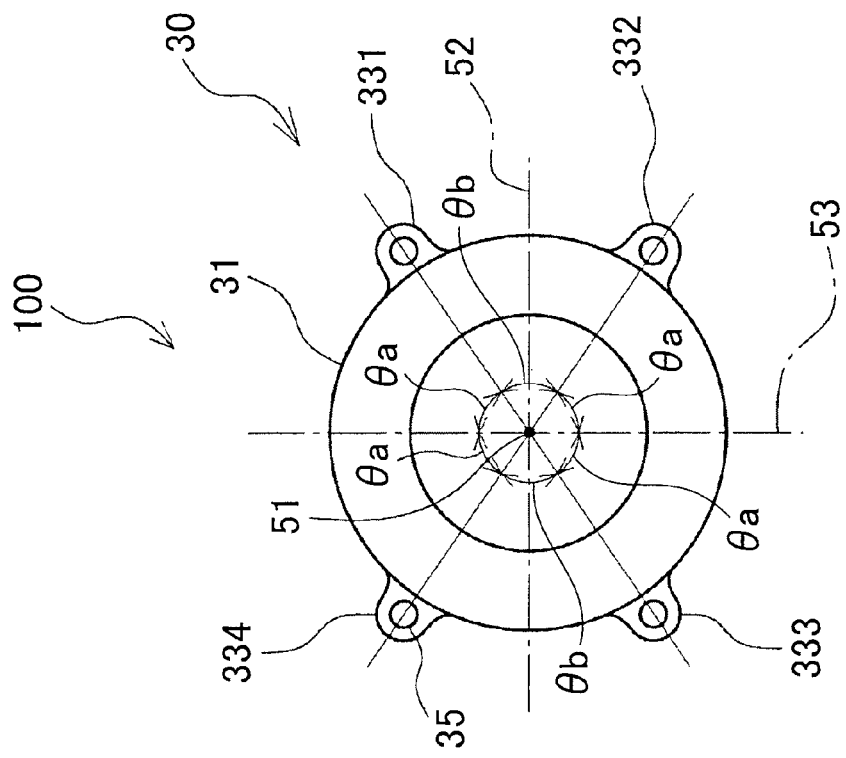
FIG. 2 shows the arrangement of fastening portions of stators of the drive device for an electric vehicle according to a first embodiment of the present invention.
Figure 2B:
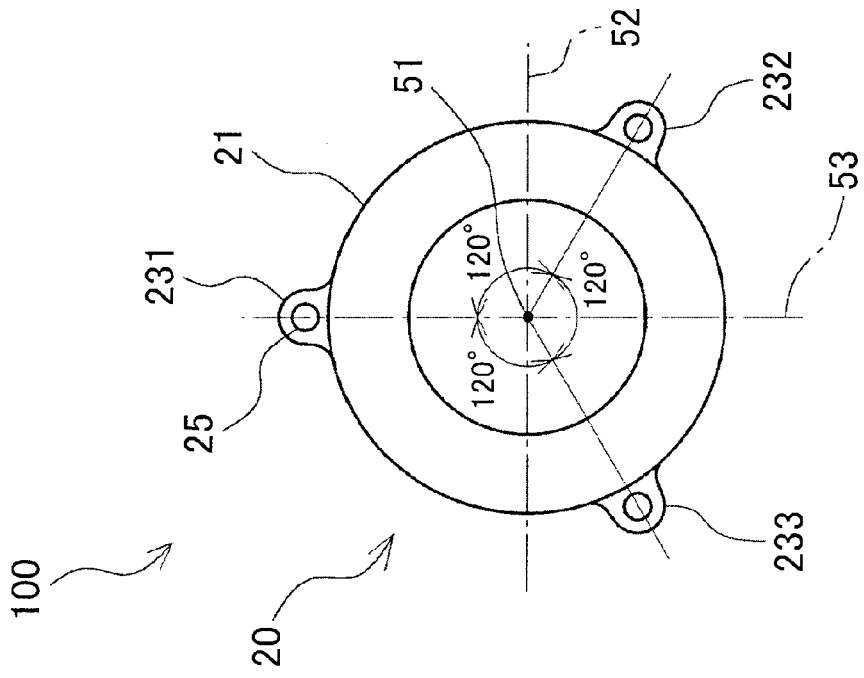

As shown in FIG. 2A, three lugs 231 to 233 that are used to fasten the first stator 21 to the casing 10 are provided at intervals of 120° in the circumferential direction. The lugs 231 to 233 are provided with respective holes 25. The fixation bolts 24 are inserted into the respective holes 25 to be fastened to the casing 10. In FIG. 2, reference numeral 52 denotes a center line in the horizontal direction. In the first embodiment, as shown in FIG. 2A, the first lug 231 is disposed at a position above the first stator 21 through which a center line 53 in the vertical direction passes. The second lug 232 is disposed at a position shifted by 120° from the first lug 231 clockwise in the circumferential direction of the first stator 21. The third lug 233 is disposed at a position shifted by 120° from the second lug 232 clockwise in the circumferential direction of the first stator 21. Meanwhile, as shown in FIG. 2B, the second stator 31 includes four lugs 331 to 334. The lugs 331 to 334 are provided with respective holes 35. The fixation bolts 34 are inserted into the respective holes 35 to be fastened to the casing 10. The first lug 331 is disposed at a position shifted by an angle θa clockwise in the circumferential direction of the second stator 31 from a position above the second stator 31 through which a center line 53 in the vertical direction passes. The second lug 332 is disposed at a position shifted by an angle Ob from the first lug 331 clockwise in the circumferential direction of the second stator 31. The third lug 333 and the fourth lug 334 are disposed opposite to the first lug 331 and the second lug 332, respectively, with respect to the center axis 51. It should be noted that an angle that is twice θa does not coincide with 120°.

Thus, the, first stator 21 is fixed to the casing 10 through the three. lugs 231 to 233. Meanwhile, the second stator 31 is fixed to the casing 10 through the four lugs 331 to 334. Therefore, the respective specific frequencies of the stators 21 and 31 in the circumferential direction are different from each other. Thus, the respective frequencies of vibration caused in the stators 21 and 31 when the drive device 100 for an electric vehicle is driven are different from each other. Therefore, in the first embodiment, the first stator 21 and the second stator 31 are unlikely to resonate with each other, which reduces vibration and noise of the drive device 100 for an electric vehicle. In the first embodiment, the number of the lugs 23 of the first stator 21 is three, and the number of the lugs 33 of the second stator 31 is four. However, embodiments of the present invention are not limited thereto, and the number of the lugs 23 may be coprime to the number of the lugs 33 so that vibration of the first stator 21 and vibration of the second stator 31 do not resonate with each other. For example, the number of the lugs 23 of the first stator 21 may be six, and the number of the lugs 33 of the second stator 31 may be five. In the first embodiment, the two motor generators 20 and 30 are mounted in the casing 10. However, the number of the motor generators mounted in the casing 10 is not limited to two, and may be three or more. In this case, a number of the lugs for one of the motor generators may be coprime to a number of the lugs for at least one of the rest of the motor generators. Further, a number of the lugs for each of the motor generators may be coprime to a number of the lugs for each of the rest of the motor generators.

In the first embodiment, in addition, the positions of the lugs 231 to 233 in the first stator 21 are offset, in the circumferential direction, from the positions of the lugs 331 to 341 in the second stator 31. This makes it possible to effectively suppress resonance between vibration of the first stator 21 in the circumferential direction and vibration of the second stator 31 in the circumferential direction. Thus, vibration and noise of the drive device 100 for an electric vehicle can be effectively reduced. In the first embodiment, vibration and noise of the drive device 100 for an electric vehicle is reduced by avoiding resonance. Thus, attachment of other means for suppressing vibration and noise is not required. This results in a simple configuration. Examples of the other means include a soundproof material and a sound insulating material. Further, the absence of resonance leads to less deformation of the casing 10, which improves the rigidity, and the reliability of the casing 10. This eliminates the need to take measures to enhance the rigidity of the casing 10, which reduces the size and the weight of the drive device 100 for an electric vehicle. Examples of such measures include increasing the wall thickness of the casing 10, adding reinforcing ribs, and increasing the fastening force with the casing 10.

A second embodiment of the present invention will be described with reference to FIG. 3. Components of the second embodiment that are the same as those of the first embodiment described earlier with reference to FIGS. 1 and 2 are denoted by the same reference numerals so that the same description will not be repeated. As shown in FIG. 3, the number of the lugs 23 of the first stator 21 to be fastened to the casing 10 is six, and the number of the lugs 33 of the second stator 31 is five.

Figure 3A:
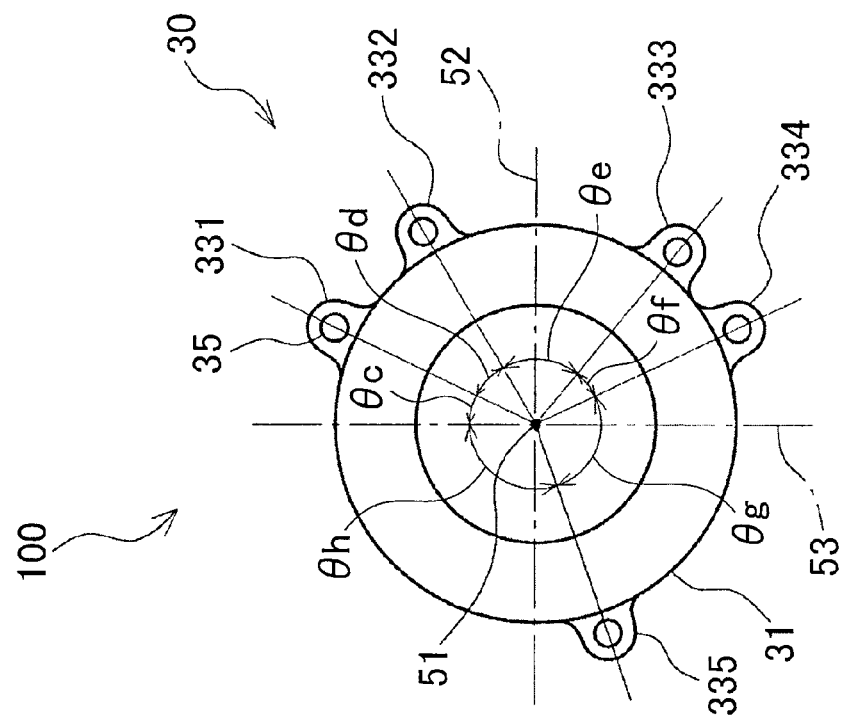
FIG. 3 shows the arrangement of fastening portions of stators of a drive device for an electric vehicle according to a second embodiment of the present invention.

In the second embodiment, as shown in FIG. 3A, the first lug 231 of the first stator 21 is disposed at a position above the first stator 21 through which the center line 53 in the vertical direction passes. The second lug 232 and the sixth lug 236 are disposed at positions shifted by 30° from the first lug 231 clockwise and counterclockwise, respectively, in the circumferential direction of the first stator 21. The fourth lug 234, the fifth lug 235, and the third lug 233 are disposed opposite to the first lug 231, the second lug 232, and the sixth lug 236, respectively, with respect to the center axis 51. Thus, the interval between the first lug 231 and the second lug 232 in the circumferential direction, the interval between the first lug 231 and the sixth lug 236 in the circumferential direction, the interval between the fourth lug 234 and the fifth lug 235 in the circumferential direction, and the interval between the fourth lug 234 and the third lug 233 in the circumferential direction are equal to each other. Meanwhile, the interval between the second lug 232 and the third lug 233 in the circumferential direction and the interval between the fifth lug 235 and the sixth lug 236 in the circumferential direction are different from the interval between the first lug 231 and the second lug 232 in the circumferential direction (or the interval between the first lug 231 and the sixth lug 236 in the circumferential direction).

Figure 3B:
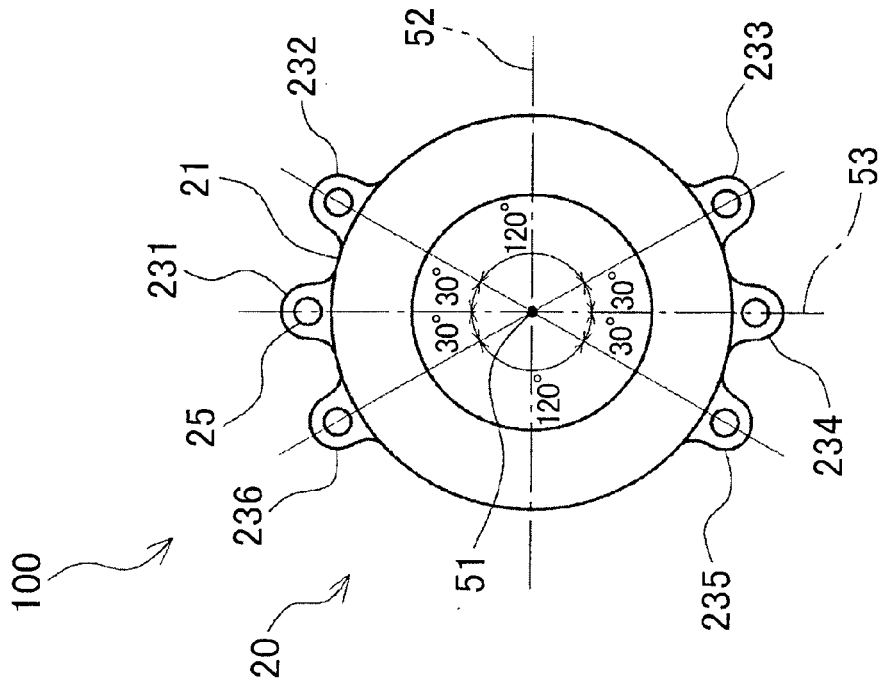

As shown in FIG. 3B, the first lug 331 of the second stator 31 is disposed at a position shifted by an angle θc clockwise from the center line 53 in the vertical direction. The second lug 332 to the fifth lug 335 are disposed at positions sequentially shifted by an angle θd to an angle θg, respectively, which are different from each other, in the circumferential direction. That is, the five lugs 331 to 335 are all disposed at unequal intervals in the circumferential direction.

In the second embodiment, as in the first embodiment which is described earlier with reference to FIGS. 1 and 2, the respective specific frequencies of the stators 21 and 31 in the circumferential direction are different from each other. Thus, the respective frequencies of vibration caused in the stators 21 and 31 when the drive device 100 for an electric vehicle is driven are different from each other. Therefore, the first stator 21 and the second stator 31 are unlikely to resonate with each other, which reduces vibration and noise of the drive device 100 for an electric vehicle. In the second embodiment, in addition, the respective lugs 23 and 33 of the stators 21 and 31 are disposed at unequal intervals in the circumferential direction. Therefore, the stators 21 and 31 are unlikely to vibrate in the circumferential direction in the first place. Thus, vibration and noise can be further effectively suppressed compared to the first embodiment.

The invention claimed is:

1. A drive device for an electric vehicle, comprising:
a casing; and
a plurality of motor generators mounted in the casing, wherein:
   each of the motor generators includes a plurality of fastening portions at which a stator of the motor generator is fixed to the casing,
   a number of the fastening portions of one of the motor generators is coprime to a number of the fastening portions of at least one of the rest of the motor generators,
   some of the plurality of fastening portions of a first motor generator of the plurality of motor generators are spaced apart at equal intervals about a circumferential direction of the first motor generator, and
   the plurality portions of a second motor generator of the plurality of motor generators are spaced apart at different intervals about a circumferential direction of the second motor generator.

2. The drive device for the electric vehicle according to claim 1, wherein a position of at least one of the fastening portions of the one of the motor generators is offset, in a circumferential direction of the stators, from positions of all of the fastening portions of the at least one of the rest of the motor generators.

3. The drive device for the electric vehicle according to claim 2, wherein center axes of the stators coincide with each other.

4. The drive device for the electric vehicle according to claim 1, wherein the stators include stator core plates with a same shape as the stators.

* * * * *